United States Patent [19]

Rehrig

[11] 4,354,088
[45] Oct. 12, 1982

[54] GAS SHIELDED WELDING TORCH

[76] Inventor: Richard B. Rehrig, 2812 Haven Way, Burbank, Calif. 91504

[21] Appl. No.: 161,736

[22] Filed: Jun. 23, 1980

Related U.S. Application Data

[63] Continuation of Ser. No. 897,376, Apr. 18, 1978, abandoned.

[51] Int. Cl.³ .............................................. B23K 9/16
[52] U.S. Cl. .............................. 219/75; 219/121 PM; 219/74; 174/15 WF
[58] Field of Search ....... 219/121 P, 121 PN, 121 PP, 219/121 PM, 75, 74; 174/15 WF, 22 R

[56] References Cited

U.S. PATENT DOCUMENTS

| 2,358,158 | 9/1944 | Gibbert | 219/75 X |
| 2,606,988 | 8/1952 | Dove | 219/75 |
| 2,685,631 | 8/1954 | Scheller | 219/75 |
| 2,743,346 | 4/1956 | Scholl | 219/75 |
| 2,797,301 | 6/1957 | Copleston | 219/75 |
| 3,109,916 | 11/1963 | Kilburn et al. | 219/75 |
| 4,049,943 | 9/1977 | Pratt | 219/74 |
| 4,140,892 | 2/1979 | Muller | 219/121 PN |

Primary Examiner—B. A. Reynolds
Assistant Examiner—M. H. Paschall
Attorney, Agent, or Firm—Lyon & Lyon

[57] ABSTRACT

Disclosed herein is a gas shielded welding torch of the TIG type, having a removable head portion to readily accommodate heads of different angular configurations. The torch includes a body portion which can be either air or water cooled, a removable head portion threadably engaged with the body portion, a nozzle, an electrode assembly carried within the head portion and means for directing an inert gas to the nozzle and electrical current to the electrode.

5 Claims, 6 Drawing Figures

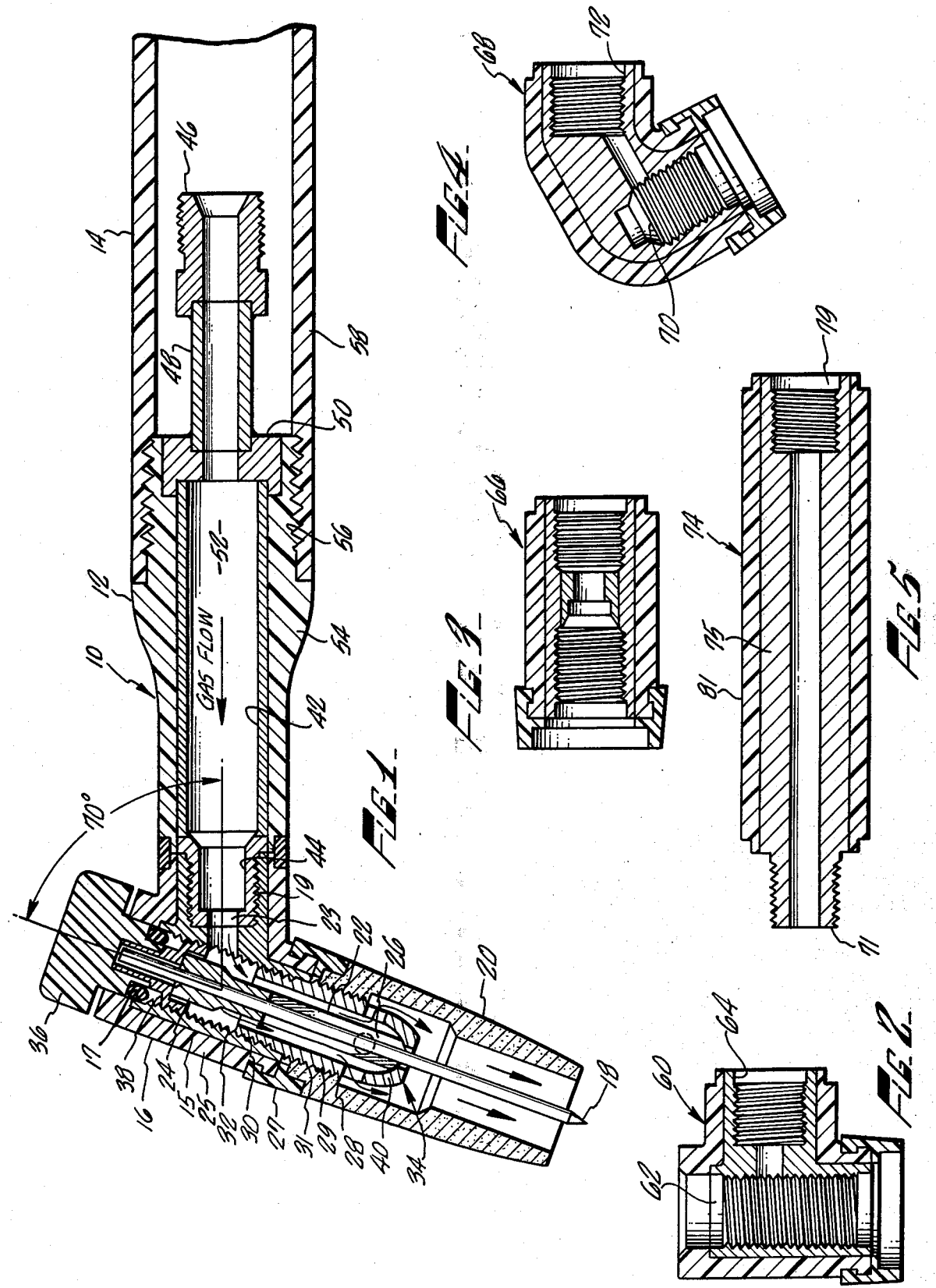

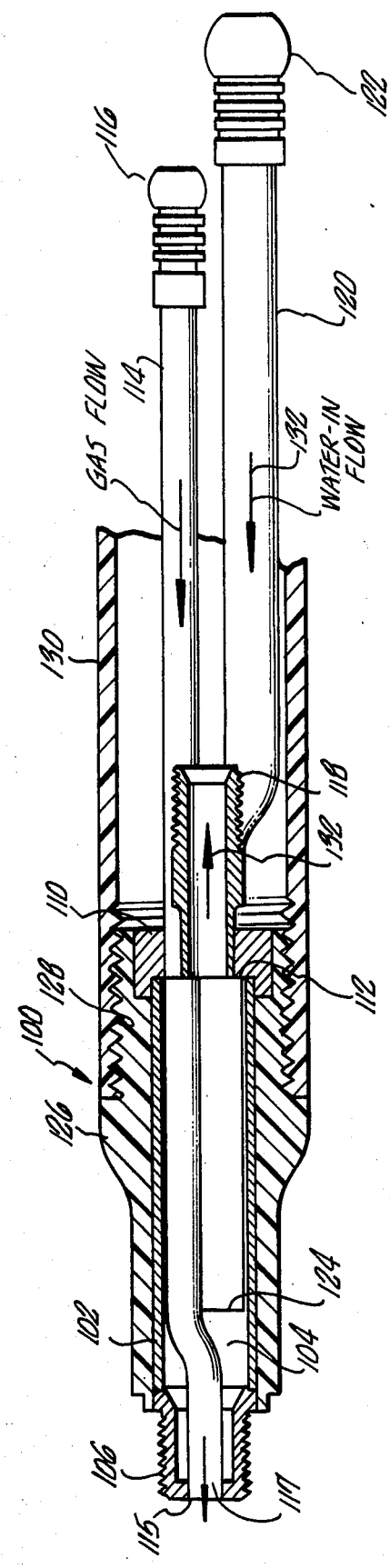

GAS SHIELDED WELDING TORCH

This is a continuation of application Ser. No. 897,376, filed Apr. 18, 1978 now abandoned.

This application for Letters Patent is a related application to one entitled Flexible Gas Shielded Welding Torch, Lyon & Lyon docket No. 152/220, filed concurrently herewith by the same inventor jointly with William Rehrig, Jr. and John Kelly.

BACKGROUND OF THE INVENTION

The present invention relates to welding torches and more particularly gas shielded tungsten-arc welding torches, commonly referred to in the trade as TIG torches. The designation TIG refers to tungsten inert gas. TIG welding is an arc welding process originally developed to weld corrosion resistant and difficult to weld metals, such as aluminum and magnesium. The necessary heat for gas tungsten-arc welding is produced by a highly concentrated arc maintained between a non-consumable tungsten electrode and the workpiece to be welded which permits pinpoint control of the heat resulting in a narrow heat affected zone. This is obviously advantageous when welding metals that possess high heat conductivity, such as aluminum and copper. The heat weld zone, the molten metal and the tungsten electrode are shielded from the atmosphere by a blanket of inert gas such as argon or helium which is fed through the electrode holder. This inert shielding gas surrounding the heat weld zone serves to blanket the weld and exclude the active properties in the surrounding air thereby preventing oxidation of the electrode, the weld puddle and the heated weld zone.

While TIG torches are highly versatile in that they are capable of welding all types of metals, their rigid configurations have made their use quite difficult in many work areas of limited or difficult access. As a result, different torches have been provided with different head configurations for use in such areas. For example, one torch with a given head configuration may emit the arc at an angle of about 70 degrees with respect to the handle, another at 90 degrees with respect to the handle, and yet another torch would emit an arc in axial alignment with the torch handle. To utilize this form of flexibility, however, it is necessary to maintain several different torches of varying head configurations which, of course, is very expensive. An attempted solution to this problem is found in U.S. Pat. No. 2,949,526, wherein a body portion of the torch was made removable from the torch handle. However, this approach did little to remedy the situation as the removable body not only comprised the head portion of the torch, but most of the remaining elements as well. Consequently, to maintain an inventory of TIG torch body portions with different head configurations is almost as costly as maintaining an inventory of torches.

Another problem resulting from the rigid construction of TIG torches is the high cost of torch head replacement. The head portion of the torch is susceptible to damage due to its proximity to the heat generated by the arc. While being highly susceptible to damage, the head portion of the torch is nevertheless relatively inexpensive as compared to the torch body. However, due to the rigid unitary construction of the torch, if the torch head becomes damaged and is not removable from the torch body, the entire body must be replaced with the head. In the welding torch of the present invention, the inexpensive head portion of the torch is readily removable from the torch body and is easily replaceable, thereby not only increasing the flexibility of the torch in that the torch can be easily provided with different head portions of varying configurations, but decreasing the cost of part replacement as well.

SUMMARY OF THE INVENTION

Briefly, the invention comprises a gas shielded welding torch having a removable head portion to readily accommodate head portions of different configurations to vary the angular orientation of the welding arc with respect to the handle and facilitate part replacement.

It is the principal object of the present invention to provide a welding torch of the TIG type which can be readily provided with head portions of varying angular configurations without the need for additional part replacement.

It is another object of the present invention to provide a welding torch of the TIG type which is adapted for use in areas of limited and difficult access.

It is a further object of the present invention to provide a welding torch of the TIG type which provides easy access to the components thereof to reduce the cost of part replacement.

It is a still further object of the present invention to provide a welding torch of the TIG type which can be readily provided with head portions of varying angular configurations in both the air-cooled and water-cooled configurations.

These and other objects and advantages of the present invention will become apparent from the following detailed description taken in conjunction with the accompanying drawings.

IN THE DRAWINGS

FIG. 1 is a cross-sectional view of the TIG torch of the present invention provided with a 70 degree head portion.

FIG. 2 is a cross-section of a 90 degree head portion for use with the TIG torch of the present invention.

FIG. 3 is a cross-sectional view of a 180 degree head portion for use with the TIG torch of the present invention.

FIG. 4 is a cross-section of a 120 degree reverse head for use with the TIG torch of the present invention.

FIG. 5 is a cross-section of a body extension for use with the TIG torch of the present invention.

FIG. 6 is a cross-section of a water-cooled torch body for use in a TIG torch of the present invention.

DESCRIPTION OF THE PREFERRED EMBODIMENT

Referring now in detail to the drawings, the welding torch 10 of the present invention is illustrated in FIG. 1. The torch shown therein is air-cooled and is comprised of a torch body 12 including a straight handle portion 14, a removable torch head 16, a tungsten electrode 18, and a nozzle 20. The torch head 16 defines a threaded central bore portion 17 adapted to house and carry the electrode assembly and a threaded conduit or hollow disconnect extension 19 by which the head 16 is threadably engaged with the torch body 12 and through which the shielding gas is directed to the central bore of the head through internal orifice 23. The torch head 16 is preferably constructed of a copper interior 15 due to its excellent thermal and electrical conductivity characteristics and is provided with an outer shell of insulating material 25 preferably silicone rubber for its superior dielectric strength and rapid heat dissipating characteristics. A gasket 27 preferably constructed of teflon is carried by the lower end of the head 16.

The electrode 18 is carried within the torch head 16 by elongated collet 22 having an enlarged imperforate end 24 and a longitudinally split end 26. When lateral pressure is applied to the split end 26 of the collet, the collet closes about the electrode securing the electrode in place. The collet 22 is in turn carried by a metal collet body 28 which is threaded at 30 on its external surface for engagement with the internal threads 32 in the central bore portion 17 of the torch head 16 and is threaded at 29 for engagement with the interior threads 31 on the nozzle 20. The lower portion of the electrode assembly which is generally designated at 34 is incased in the nozzle 20 (as seen in FIG. 1) which directs the flow of gas about the welding zone. The nozzle is preferably constructed of a ceramic material or of alumina [an aluminum oxide] while the collet 22 and collet body 28 are preferably constructed of copper.

The positioning of the electrode with respect to the nozzle is adjusted by means of a collet cap 36. The collet cap is constructed of an insulating material and includes a metal insert 38 preferably constructed of brass, by which the cap is threadably mounted in the upper end of the torch head 16. An "O" ring seal 41 is carried by the collet cap 36 to prevent any gas leakage through the upper portion of the torch head. When the collet cap is loosened, the lateral pressure on the collet is relaxed and the electrode is free to be linearly moved within the collet or removed. As the collet cap is rotated in the clockwise direction, the threaded extension 38 urges the collet against the tapered end portion 40 of the collet body tightening the longitudinally split end 26 of the collet about the electrode.

The air-cooled torch body 12 is comprised of a hollow tubular member 42, a threaded connector extension 44 of reduced diameter, and a threaded gas inlet fitting 46 which communicates with the tubular member 42 via extension 48 and slug fitting 50. Each of these elements 42 through 50 are constructed of an electrically conductive material and joined together so that they are in electrical as well as structural communication and define a central channel 52 for the passage of the shielding gas therethrough. A tubular insulating shell 54 is disposed about member 42 as seen in FIG. 1 which defines external threads 56 thereon for threaded engagement with a torch handle 58 which is also constructed of an insulating material. In the preferred construction of the torch body 12, the connector extension 44, tubular member 42 and extension 48 are constructed of copper for its superior thermal and electrical conductivity, while the slug fitting 50 and gas inlet fitting 46 are constructed of brass to facilitate machining.

To secure the torch head 16 and electrode assembly 34 carried thereby to the torch body 12, the disconnect extension 19 of the torch head is threadably engaged with the externally threaded connector 44 extending from the torch body. An insulating gasket 45 preferably constructed of teflon is disposed between the insulating shell 54 and the insulating material 25 of the torch head to prevent any leakage therebetween. By means of this threaded connection, the torch head and electrode assembly can be easily secured to and removed from the torch body and a positive gas and electrical seal is obtained between the torch head 16 and torch body 12. Similarly, the electrode assembly can be easily secured to and removed from the torch head.

FIGS. 2 through 4 illustrate different torch head configurations for use in the torch 10. The torch head 60 illustrated in FIG. 2 differs from the torch head 16 secured to the torch body in FIG. 1 in that the threaded bore 17 of torch head 16 is disposed at about 70 degrees with respect to the longitudinal axis of the threaded extension 19 by which the torch head is secured to the torch body while the internal threaded bore 62 of torch head 60 is disposed at 90 degrees with respect to the longitudinal access of the threaded extension 64 thereof. While 70 degrees has been found to be the preferred angular orientation for general use, a 90 degree head is often desirable in certain working areas. Similarly, a 180 degree torch head 66, illustrated in FIG. 3, has many applications where the work product would be relatively unaccessible with either torch head 16 or 60. The same is true with respect to the torch head 68 illustrated in FIG. 4 wherein the threaded bore 70 defines an angle of 120 degrees with respect to the threaded extension 72 and thus constitutes a reverse head.

FIG. 5 illustrates a torch body extension 74 comprised of a central tube 75 having a threaded male end 77 and female end 79 and is incased in an insulating shell 81. The female end 79 of the extension is adapted to be threadably engaged with the threaded extension 44 on the torch body 12 and the male end 77 threadably engaged with any of the aforesaid torch heads. In this manner extension effectively increases the over-all length of the TIG torch handle.

As can be seen from the aforesaid description, the torch heads of the present invention, each of which comprise a threaded bore portion adapted to receive the electrode assembly 34 and an externally threaded extension which communicates with the bore portion and is adapted for threaded engagement with the torch body, allow the torch head to be easily replaced when damaged without having to replace the more expensive torch body or replaced with a head of a different angular configuration to facilitate access to a particular work piece. Accordingly, the TIG torch 10 is not only highly flexible in its use, but very inexpensive to maintain.

The operation of the air-cooled torch 10 is relatively straight-forward. An inert shielding gas such as argon or helium is delivered from a pressurized source [not shown] to the threaded gas inlet fitting 46 from where the gas passes into the torch head and out the nozzle 22 where it surrounds the heat weld zone. The tungsten electrode 18 is supplied with current by virtue of its mechanical and electrical contact with the collet 22, collet body 28, torch head 16 and the electrically conductive components comprising the torch body 12. The electrical power source [not shown] is electrically coupled to the torch body through the gas inlet fitting 46 through which the shielding gas flows.

FIG. 6 illustrates a water-cooled torch body 100 which is adapted for use with any of the torch heads illustrated in FIGS. 1 through 4. Water cooling allows a much higher welding capacity without increasing the physical size of the torch by dissipating the heat that is generated in the torch during the welding cycle. The water-cooled torch body 100 is comprised of a hollow tubular member 102 defining a water chamber 104 therein, a threaded connector extension 106 welded or otherwise electrically and structurally secured to the forward end 102 thereof for threadably securing the torch body 100 to a torch head. A slug fitting 110 is similarly secured to the rearward end 112 of the tube. A gas inlet tube 114 having a fitting 116 at one end thereof extends through and is secured to the slug fitting 110 and terminates at its forward end 117 in the outlet end 115 of the threaded extension 106 for directing the gas flow passing therethrough to the torch head. A hollow electrical power cable connector 118 which is adapted to be secured to a suitable power source [not shown] is electrically and structurally secured to the slug fitting 110 and communicates with the water chamber 104 within the tubular member 102.

Electrical current is conducted through connector 118 to the tungsten electrode through the same corresponding series of electrically conductive components found in the aforesaid described air-cooled torch body 12. A water inlet tube 120 having a fitting 122 at one end thereof extends through and is secured to the slug fitting 110 and terminates at its forward end 124 in water chamber 104. As with the air-cooled torch body 12, an insulating shell 126 is disposed about tubular member 102 which defines external threads 128 thereon for threaded engagement with an insulating handle 130. Similarly, in the preferred embodiment of the water-cooled torch body, the hollow tubular member 102, threaded boss 106 and power cable connector are constructed of copper; the slug fitting 110 and gas and water inlet fittings 116 and 122 are constructed of brass while the gas and inlet tubes 114 and 120 are constructed of stainless steel.

The operation of the torch equipped with the water-cooled torch body 100 is very similar to the operation of the air-cooled torch 10. The shielding gas is delivered to the heat weld zone through the gas inlet tube 114, the torch head communicating therewith and the nozzle carried by the torch head. The tungsten electrode is supplied with current by virtue of its mechanical and electrical contact with the above discussed electrically conductive components in the torch head, threaded boss 106, the hollow tubular member 102, slug fitting 110 and the power cable connector 118. Cooling water is circulated through the torch body 100 by means of a conventional pump assembly [not shown] which directs water through the water inlet tube 120 into water chamber 104 and outwardly therefrom through the power cable connector 116 as illustrated by the arrows 132 shown in FIG. 6. This conduit system within the torch body allows water to be continually circulated throughout the torch body during use to prevent the TIG torch from becoming too hot to be comfortably operated without interfering with the threaded disconnect by which the torch head is secured to the torch body for rapid torch head and component replacement.

Various changes and modifications may be made in carrying out the present invention without departing from the spirit and scope thereof. Insofar as these changes and modifications are within the purview of the appended claims they are to be considered as part of the present invention.

I claim:

1. A welding torch of the gas shielded type comprising a body portion, a head portion threadably connected to said body portion and an electrode assembly carried by said head portion, said body portion having a central flow through conduit, a gas inlet in electrical and fluid communication with one end of said conduit and being adapted to be communicated with a supply of pressurized shielding gas, a gas outlet secured to the other end of said conduit in electrical and fluid communication therewith and defining threaded attachment means therein, said head portion including a central hollow tubular member defining a threaded bore portion for the mounting of said electrode assembly therein and a hollow threaded tubular connector portion extending radially from said bore portion, said connector portion being axially aligned with and threadably engaged with said attachment means on said gas outlet in electrical and fluid communication therewith and defining the sole electrical connection and physical securement between said head portion and said body portion such that said head portion can be threadably detached intact from said body portion by relative rotation between said head and body portions and a nozzle carried by said head portion for directing the flow of gas therefrom.

2. The combination of claim 1 wherein said gas inlet defines an electrical contact for electrically communicating said torch with an electrical power supply.

3. The combination of claim 2 wherein said gas outlet is defined by a threaded member secured to and extending from said other end of said conduit and said head portion of said torch defines an elongated bore for receiving said electrode assembly and a threaded conduit in electrical and fluid communication with said bore and in threaded engagement with said member whereby said head portion is detachably secured to said body portion.

4. A welding torch of the gas shielded type comprising a body portion, a head portion threadably connected to said body portion and an electrode assembly carried by said head portion, said body portion being comprised of a tubular member defining a water chamber therein and threaded attachment means at one end thereof, a water inlet conduit in fluid communication with said chamber, a water outlet conduit in fluid communication with said chamber, at least one of said conduits being in electrical communication with said tubular member and a gas conduit extending through said tubular member and adapted to be communicated with a supply of pressurized shielded gas, said head portion including a central hollow tubular member defining a threaded bore portion for the mounting of said electrode assembly therein and a hollow threaded tubular connector portion extending substantially radially from said bore portion, said connector portion being threadably engaged with said attachment means on said tubular member in electrical communication therewith and in fluid communication with said gas conduit and defining the sole electrical connection and physical securement between said head portion and said body portion and a nozzle carried by said head portion for directing the flow of shielding gas therefrom such that said head portion electrically communicates said electrode assembly carried thereby with said tubular member and can be threadably detached intact from said body portion by relative rotation between said head and body portions for replacement of said head portion without effecting the flow of water through said inlet conduit, water chamber and outlet conduit.

5. A welding torch of the gas shielding type comprising a body portion, a head portion threadably connected to said body portion and an electrode assembly carried by said head portion, said body portion having a flow through conduit, a gas inlet in electrical and fluid communication with one end of said conduit and being adapted to be communicated with a supply of pressurized shielding gas, a gas outlet in electrical and fluid communication with the other end of said conduit and defining threaded attachment means thereon, said head portion including a disconnect member of unitary construction, said disconnect member defining a threaded bore portion for the mounting of said electrode assembly therein and a hollow threaded tubular connector portion extending radially from said bore portion, said connector portion being threadably engaged with said attachment means on said gas outlet in electrical and fluid communication therewith and defining the sole electrical connection and physical securement between said head portion and said body portion whereby said head portion can be threadably detached from said body portion by relative rotation between said head and body portions; and a nozzle carried by said head portion for directing the flow of gas therefrom.

* * * * *